INFORMATION HANDLING DEVICES

Filed May 5, 1959

INVENTOR.
FRED STERZER
BY Milton S. Winters
ATTORNEY

United States Patent Office 3,134,024
Patented May 19, 1964

3,134,024

INFORMATION HANDLING DEVICES

Fred Sterzer, Monmouth Junction, N.J., assignor to Radio Corporation of America, a corporation of Delaware Filed May 5, 1959, Ser. No. 811,079
13 Claims. (Cl. 307—88)

This invention relates in general to information handling devices such as logic circuits, shift registers, and the like, which are suitable for use in digital computers. More particularly, this invention relates to information handling devices of the type employing parametric oscillators.

It has been suggested that information handling systems use radio frequency (R.F.) signals to represent information in coded form. For example, R.F. signals of one frequency and phase may represent a binary "one" in such a system, and R.F. signals of the same frequency but of opposite phase may represent a binary "zero." The term "phase script notation" is sometimes used to denote generically information coding schemes of this type. Certain advantages obtain when the various circuits are adapted to handle information expressed in the "language" of the machine.

It is desirable in information handling systems that the circuits and components used therein be of high speed both in response and recovery time. It is also desirable that they be reliable in operation and have low power requirements.

It has been suggested further that parametric oscillators be used to amplify, switch and store binary information in a system using phase script notation. As is known, a bistable parametric oscillator is capable of oscillating in either of two distinct phases at the same frequency when energized by an alternating current (A.C.) pump signal. Moreover, oscillations are sustained at the one phase until the oscillator is acted upon by an external switching force. In parametric oscillators, as commonly employed, the signal output is partially coupled to the signal input.

In order to overcome the problems resulting from this coupling of signal output to signal input, in some applications various time multiplexing schemes are used. Most such schemes, however, significantly reduce the maximum pulse rate achievable.

High frequency parametric oscillators sometimes use an isolator, or other form of nonreciprocal energizing translating device, between adjacent oscillator stages, to prevent undesired couplings. A novel shift register employing isolator devices is described in my copending application for "Shift Circuits," Serial No. 791,082, filed February 4, 1959, now U.S. Patent No. 3,002,108, and assigned to the same assignee as the present invention. However, isolators are not presently available for all operating frequencies of interest. Furthermore, some power is absorbed by the isolators, and the isolators introduce into the circuit a time delay which may be objectionable in some applications. Also, known isolators are not completely compatible with printed circuits because of their size.

Accordingly, it is an object of the present invention to provide improved information handling devices.

It is another object of the present invention to provide improved information handling devices which are of high speed both in response and recovery time.

It is a further object of the present invention to provide an improved logic circuit which employs parametric oscillators and which does not have the aforementioned disadvantages.

It is still another object of the present invention to provide an improved shift circuit which employs parametric oscillators and which does not have the aforementioned disadvantages.

Yet another object of the present invention is to provide improved information handling devices which are reliable in operation and have low power losses.

Still another object of the present invention is to provide improved logic circuits employing parametric oscillators in which the information flows in a single direction and in which power losses are reduced.

A further object of the present invention is to provide an improved shift register employing parametric oscillators in which the information flows in a single direction and in which power losses are reduced.

These and other objects of the present invention are accomplished by providing, for each information handling device or stage thereof, two bistable parametric oscillators and a hybrid circuit or junction having four arms. Each of the oscillators is connected to a different arm of the hybrid circuit with one oscillator effectively a quarter wavelength more distant from the hybrid circuit than the other oscillator. The oscillators are so energized that they oscillate out of phase with each other, An input signal applied to another arm divides equally between the two oscillators because of the properties of the hybrid circuit. This input signal serves as a locking signal to determine the phases of oscillations of the parametric oscillators. The outputs of the oscillators appear entirely at the fourth arm, or output arm, again because of the properties of the hybrid arrangement.

The foregoing and other objects, advantages and novel features of this invention will be more fully apparent from the following description when read in connection with the accompanying drawing, in which like reference numerals refer to like parts, and in which.

Figures 1, 2, 3, 4, 5:
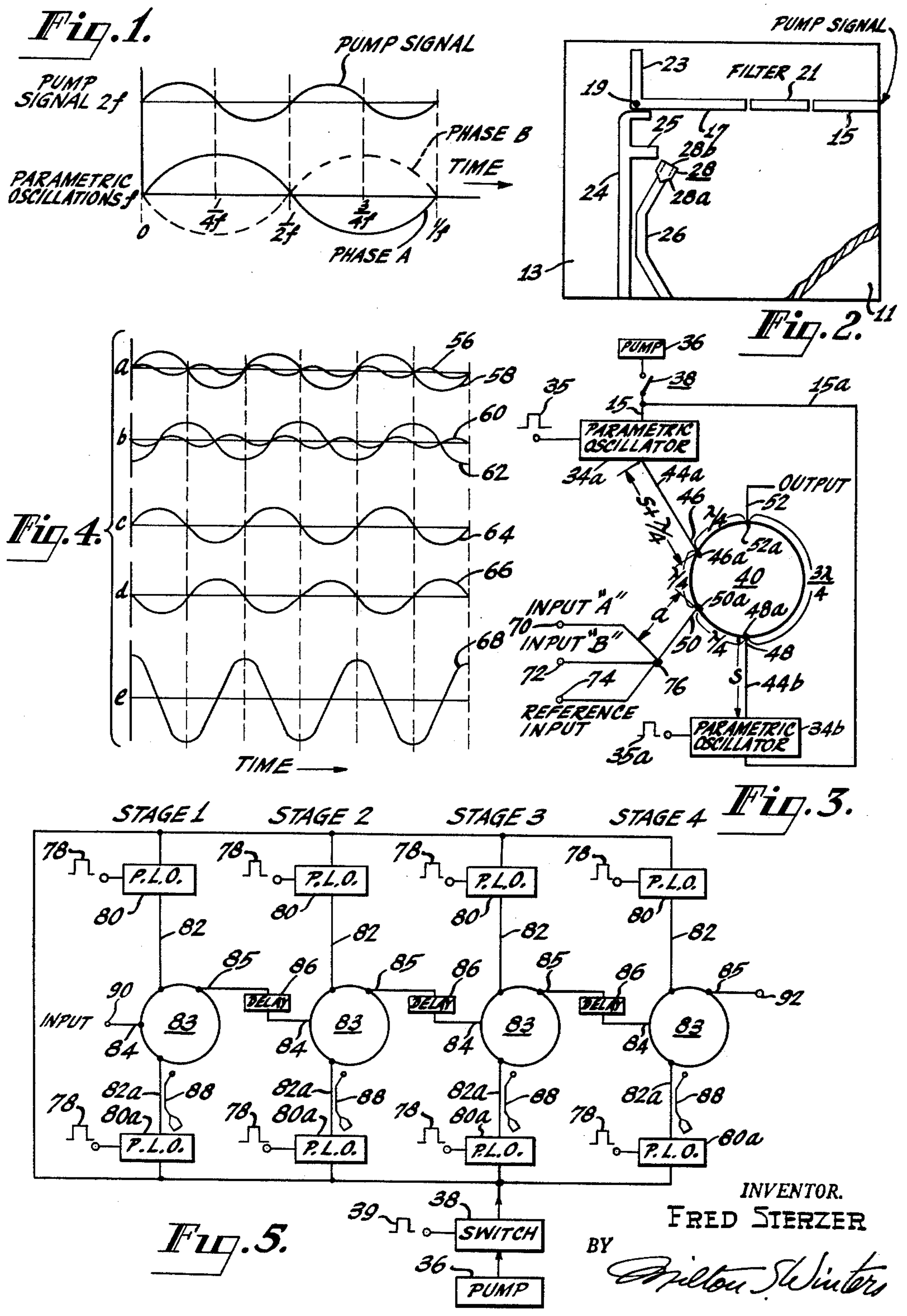
FIGURE 1 is a set of curves which illustrate the phase relationships of the two possible phases of oscillation of a bistable parametric oscillator to that of a pump energizing signal.
FIGURE 2 is a plan view of a parametric oscillator and coupling arrangement constructed of strip transmission line and suitable for use in practicing the present invention.
FIGURE 3 is a diagram of a logic circuit according to the present invention, which logic circuit is capable of performing either the "and" or "or" logical function.
FIGURE 4 is a set of timing diagrams useful in explain-the operation of the logic circuit of FIGURE 3.
FIGURE 5 is a diagram of a shift register according to the present invention.

Parametric oscillators, as is known, generally comprise an element of variable reactance. When the resonant frequency of the oscillator is varied at one of certain prescribed rates, as by varying the reactance of the variable element, the oscillator may be driven into parametric oscillation. This may be effected, for example, by driving or pumping the oscillator with an A.C. (alternating current) signal from an external source. The parametric oscillations are sustainable so long as the driving signal exceeds a certain critical value. Assuming that the parameters of the oscillator and the amplitude of the driving signal are adjusted in known fashion so that the frequency of the parametric oscillations is one-half the frequency of the driving signal, two possible phases exist in which the parametric oscillations may be sustained. These phases differ by 180° and bear a definite relationship to the driving signal. This is illustrated in FIGURE 1, which is a set of curves showing the two possible phases of oscillation, designated phase A and phase B, drawn to the same time scale as the driving signal. Relative amplitudes shown are illustrative only.

Which of the two possible phases of oscillations obtains is determined by conditions existing in the oscillator circuit at the time oscillations commence. The phase is indeterminite if noise alone is present, or if noise predominates over any signals present. However, the oscillator may be steered into one or the other phase of oscillation by applying to the oscillator a small signal at the parametric oscillator frequency (one-half the pump frequency) during the time oscillations are starting to build up in amplitude. Such a signal is commonly referred to as a "locking" signal. The oscillations then lock in at that one of the two possible phases which is closest to the phase of the locking signal. By way of example, in theory a locking signal which either leads phase A by slightly less than $\pi/2$ radians, or lags phase A by slightly less than $\pi/2$ radians, or lies somewhere in the intervening range, will cause the parametric oscillations to build up in phase A. The range is somewhat more critical in practice, however, and certain advantages obtain, such as faster operation, when the locking signal is in phase with either phase A or phase B, depending upon which phase of oscillation is desired.

A bistable parametric oscillator, capable of high frequency operation and suitable for practicing the present invention, is illustrated in FIGURE 2. The components are of so-called strip transmission line construction. Such strip transmission line may be constructed by employing a metal ground plate 11, which may be copper, applied as a backing on one surface of a suitable dielectric material 13. On the other surface of the dielectric are strips of metal, such as copper, which may be established by printed circuit etching or plating techniques to form the desired circuit. A transmission line is formed between the strip copper and the spaced ground plate 11. The pump, or drive, signal from an A.C. signal source (not shown) is coupled to the oscillator by way of the section 15 of strip transmission line. The parametric oscillator circuit comprises a section 17 of strip transmission line and a voltage-sensitive, variable-capacitance diode (not shown) mounted at the point 19. The diode may be mounted in the manner illustrated in the copending application of Walter R. Beam and Fred Sterzer, Serial No. 770,822, filed October 10, 1958, for "Parametric Oscillator Circuits," now U.S. Patent No. 3,051,844, and assigned to the assignee of the present invention. The parametric oscillator circuit illustrated in FIGURE 2 is shown and described in more detail in the last-mentioned copending application. The diode and the section 17 of strip transmission line form a resonator. The parameters of the resonator are adjusted so that parametric oscillations are sustained at a frequency one-half that of the drive signal supplied by the A.C. signal or pump source.

A section 21 of strip transmission line is inserted between the oscillator section 17 and the drive signal input section 15. The section 21 is preferably one-half wavelength at the drive frequency and serves as a filter which passes the drive signal to the oscillator and prevents signals at the oscillator frequency from feeding back to the A.C. signal source. A D.C. (direct current) return path from the parametric oscillator to reference ground is provided by a section 23 of strip transmission line. The section 23 is approximately one-quarter wavelength electrically at the oscillator frequency, and the end furthest from the diode is connected to the ground plate 11, so that the section 23 appears electrically as an open-circuit or high impedance shunt for the A.C. signals at the oscillator frequency.

The coupling for the output is in the form of a tapered section 24 of strip transmission line which tapers down to a very small fraction of the normal width of the strip conductor, and approaches within the perhaps 0.02 inch of the diode end of the resonator. Coupling may be decreased by shaving off part of the end of the coupling section 24, or increased by connecting a wire on the surface of the output coupling section to appraoch nearer the diode resonator. A filter is provided in the output coupling section to remove components of the drive, or pump, signal from the output. Such a filter may be a stub 25 which is one-quarter wavelength electrically at the drive frequency and grounded at its outer end.

A directional coupler 26 adjacent the output coupler 24 may be used to provide loose coupling between the parametric oscillator and external circuitry. For example, a portion of the oscillator output may be tapped off from the directional coupler 26. Either of the couplers 24, 26 may be used to supply a locking signal to the oscillator. The utility of such devices will be more readily apparent from a description of the shift register circuit of FIGURE 5. It is desirable to terminate the coupler 26 in a matched absorptive termination 28 to prevent signal reflections. Such a termination 28 is known in the art and may be a thin flat piece of dielectric material coated on the side adjacent the coupler with absorptive material, such as graphite. The termination 28 may have a tapered portion **28*a* which is laid over the end portion of the coupler 26, and a rectangular section 28*b* into which the tapered section 28*a*** merges.

Parametric oscillations are sustainable in the oscillator so long as the amplitude of the pump signal applied to section 15 exceeds a certain critical value. Lowering the amplitude of the pump signal below this value causes the amplitude of oscillations to decay. When the amplitude of the pump signal is again raised above the critical value, oscillations resume in a phase determined by conditions existing in the oscillator at that time. The oscillator may be steered into phase A or phase B by applying a locking signal to the oscillator at this time. The locking signal may be applied to the oscillator directly by way of the output coupler 24, or indirectly by way of the directional coupler 26.

Oscillations may also be damped by applying a voltage pulse to the oscillator, for example, across the diode, to change the reactance of the variable capacitance diode and, hence, the resonant frequency of the oscillator. This method of damping oscillations is described more fully in the aforementioned copending application of Beam and Sterzer.

A logic circuit according to the present invention is illustrated in FIGURE 3, and includes a pair of parametric oscillators **34*a*, 34*b* adjusted to oscillate parametrically at the same frequency $f$ when energized by an A.C. drive signal at a frequency $2f$. The oscillators may be of the type illustrated in FIGURE 2 and described previously. A pump 36 supplies A.C. signals at a frequency $2f$ to the oscillators 34*a*, 34*b* through a switch device 38. The pump 36 may be, for example, a klystron, magnetron, or triode oscillator. The pump 36 is adjusted so that the A.C. drive signals are of sufficient amplitude to sustain parametric oscillations. A suitable switch for selectively coupling and decoupling the pump 36 and oscillators 34*a*, 34*b*** is disclosed in my copending application for "Logic Circuits," Serial No. 745,220, filed June 27, 1958, now U.S. Patent No. 3,038,086, and assigned to the assignee of the present invention.

The oscillator **34*a* is connected to one arm 46 of a hybrid circuit 40 by a transmission line 44*a* having a length $s+\lambda/4$, where $\lambda$ is a wavelength at the oscillator frequency $f$. The dimension of the length $s$ is determined in a manner to be described hereafter. The other oscillator 34*b* is connected to an arm 48 of the hybrid circuit 40 by a transmission line 44*b* having a length $s$. The hybrid circuit 40 may be a magic "T," rat race, or other equivalent hybrid circuit, for all of which the term "hybrid" is used herein as a generic term. The hybrid circuit 40 has a third arm 50 to which an input signal is applied, and a fourth arm 52** from which the output signal is derived.

The hybrid circuit 40 includes a circular strip of transmission line having a mean circumference of $3\lambda/2$, where $\lambda$ is the wavelength at the parametric oscillator frequency $f$. Electrically, the junction **50*a* of the input arm 50 is located ¼ of a wavelength at the oscillator frequency $f$, respectively, from the junction 46*a* and 48*a*** of the adjacent arms 46 and 48. The junction 52*a* of the output arm 52 is located ¾ of a wavelength from the junction 48*a* of the arm 48 and ¼ of a wavelength from the junction 46*a* of the arm 46. All these junctions, of course, are with the circular transmission line. Because of the properties of the hybrid circuit 40, a signal applied at the input arm 50 divides between the adjacent arm 46 and 48; none of the input signal is coupled to the output arm 52. This is so because any signal flowing in a clockwise direction from the input arm 50 to the output arm 52 is cancelled by the signal flowing counterclockwise around the circuit to the output arm 52. The hybrid circuit 40 thus provides signal isolation between the input and output arms 50, 52, respectively.

The pump 36 and oscillators 34*a*, 34*b* are arranged so that the parametric oscillations in oscillator 34*a* lag the parametric oscillations in oscillator 34*b* by 90° at the parametric oscillating frequency *f*. By reference to FIGURE 1, it may be seen that this may be accomplished by delaying the pump signal fed to oscillator 34*a* for a time interval ¼*f*. When the oscillators 34*a*, 34*b* have the form shown in FIGURE 2, this out-of-phase pumping may be provided by extending the line section 15 of oscillator 34*a* by a half wavelength at the pump frequency 2*f*. The pump signals applied to oscillator 34*b* and the resulting parametric oscillations may be represented by the curves 56, 58, respectively, of FIGURE 4*a*. The delayed pump signals applied to oscillator 34*a* and the oscillations in that oscillator 34*a* may be represented by the curves 60, 62, respectively, of FIGURE 4*b*.

For purposes of illustration only, assume that the length *s* of transmission line 44*b* is an integral number of wavelengths at the parametric oscillating frequency *f*. The signals arriving at the arm 48 of the hybrid circuit from the parametric oscillator 34*b* are then represented by the curve 64 of FIGURE 4*c*. These signals appear to be in phase with the oscillations in the oscillator 34*b*, as represented by curve 58 of FIGURE 4*a*, because of the length *s* of transmission line 44*b*. The signals arriving at the arm 46 from the other oscillator 34*a* are represented by the curve 66 of FIGURE 4*d*. These signals appear to lag the oscillations in oscillator 34*a* by 90° because of the extra quarter wavelength length of transmission line 44*a*. Because of the properties of the hybrid circuit, these signals cancel at the input arm 50, and add at the output arm 52. The signal derived at the output arm is shown by the curve 68 of FIGURE 4*e*. It is thus seen that none of the power output from the oscillators 34*a*, 34*b* is lost to the input circuit when the amplitudes of the outputs of the oscillators 34*a*, 34*b* are properly adjusted.

Consider now the operation of the circuit of FIGURE 3 as a logical "or" circuit. For purposes of this example, an "or" circuit in a system using phase script notation may be defined as a circuit having two or more inputs and one output, and providing at the output a signal representing a binary "one" whenever one or more of the inputs has a phase representing a binary "one." The two inputs, A and B in this case, are applied to separate input terminals 70, 72, respectively. Each of the inputs is an A.C. signals having a frequency *f* and a phase representing either a binary "one" or a binary "zero," hereafter referred to as binary "one" and binary "zero" signals. A binary "one" reference signal is applied to a third input terminal 74. The A and B input signals and the reference signal are preferably adjusted to be equal in amplitude. These signals are added algebraically at a junction 76, and the summation signal is applied at the input arm 50 of the hybrid circuit 40.

The input signal at arm 50 is a binary "one" whenever either, or both, of the input signals A and B is a binary "one." A binary "zero" signal is fed to the input arm 50 whenever both of the inputs A and B are binary "zero" signals. The signals fed to the input arm 50 divide entirely between the adjacent oscillator arms 46, 48, as previously described, and serve as locking signals for the oscillators 34*a*, 34*b*, respectively. The switch 38 is periodically opened for an interval of time sufficient to allow the amplitudes of oscillations to decay to a suitably low value. When the switch 38 is again closed, oscillations resume in a phase determined by the locking signals. Alternatively, oscillations may be damped by applying voltage pulses 35, 35*a* to the oscillators 34*a*, 34*b*, respectively. These pulses may originate at a common pulse source (not shown). The length *s* of transmission line 44*b* is selected so that a binary "one" signal fed to the input arm 50 causes the oscillator 34*b* to oscillate parametrically in the phase representing a binary "one." The binary "one" input signal also causes oscillations in the oscillator 34*a* to lock in a phase lagging the oscillations in oscillator 34*b* by 90°, because of the extra $\lambda/4$ length of transmission line 44*a* and the out-of-phase pumping of the oscillator 34*a*. Assuming that the curve 58 of FIGURE 4*a* represents a binary "one" output of the oscillator 34*b*, then the output from arm 52 is represented by the curve 68 of FIGURE 4*e* when either of the input A or B, or both, is a binary "one" signal. When both of the A and B inputs are binary "zero" signals, then the signals of frequency *f* appearing at different places in the circuit are 180° out of phase with the signals illustrated in FIGURE 4.

An *n* input "or" circuit, where *n* is the number of information inputs, may be provided by applying $n-1$ separate binary "one" reference inputs to the terminal 76. Alternatively, a single reference input having an amplitude $(n-1)$ times the amplitude of an information signal may be applied to terminal 74.

The circuit of FIGURE 3 performs the logical "and" junction when a binary "zero" signal is applied at the reference input terminal 74. An "and" circuit, or gate, in a system using phase script notation may be defined as a circuit whose output is a binary "one" signal only when every input to the circuit is a binary "one" signal. The algebraic sum of the A and B inputs and the reference input is a signal representing the binary "one" only when both of the A and B inputs are binary "one" signals. Only under these circumstances will a binary "one" signal be derived at the output arm 52. The summation signal applied at the input arm 50 of the hybrid circuit 40 has a phase representing the binary "zero" whenever either of the A and B inputs is a binary "zero" signal. The output derived at the output arm 52 is a binary "zero" signal in the latter case. A three input "and" circuit is provided by applying a third information signal to the terminal 74 in place of the reference input signal.

A four stage shift register according to the present invention is illustrated in FIGURE 5. The particular number of stages is illustrative only; any other number of stages may be used, as required in a particular application. Common connections and the showing of the ground plane are again omitted for clarity of drawing. All of the connecting transmission lines illustrated in FIGURE 5 may be constructed of strip transmission line. The stages 1 to 4 are similar to each other, and each stage is generally similar to the circuit of FIGURE 3, except as noted hereafter.

A common pump 36 supplies A.C. energizing signals at a frequency 2*f* to the parametric phase-locked oscillators (P.L.O.) 80, 80*a* of each stage. A switch 38 provides selective decoupling of the energizing signals in response to a control signal 39. The control signal 39 may originate, for example, at a timing pulse generator (not shown) or other suitable source, and is of such duration as to allow the amplitudes of the parametric oscillations to decay to a low value, as previously explained. Alternatively, voltage pulses 78 may be applied to the oscillators 80, 80*a* to damp oscillations therein. The A.C. energizing signals from the pump 36 are of sufficient amplitude to sustain parametric oscillations in the oscillators 80, 80*a* at a frequency *f*. Oscillations in each oscillator 80 lag the oscillations in the other oscillator 80*a* of the same stage by 90°.

Referring now to stage 1 as representative of the other stages 2 to 4, the length of transmission line 82 connecting the oscillator 80 to the hybrid circuit 83 is a quarter of a wavelength longer at the oscillating frequency $f$ than the transmission line 82a connected between the other oscillator 80a and the hybrid circuit 83. Consequently, the oscillator 80, 80a outputs arriving at the hybrid circuit 83 are 180° out of phase with each other. These outputs cancel at the input arm 84 and add in phase at the output arm 85 because of the properties of the hybrid circuit 83. Thus, ideally, there is no oscillator output power lost at the input arm 84. The output of the hybrid circuit 83 is fed through a delay device 86 to the input arm 84 of the next succeeding hybrid circuit 83. The delay device 86 may be any means for providing a suitable delay, and may be, for example, a section of strip transmission line.

The amplitudes of the parametric oscillations decay whenever switch 38 is opened. When the switch 38 is again closed, oscillations in the oscillators 80, 80a resume in a phase determined by the signal applied at the input arm 84 of that stage. The purpose of the delay 86 is to insure that a locking signal is present at the input arm 84 of the next stage when the switch 38 is again closed. The total delay between adjacent corresponding oscillators 80 (or 80a) is close to an integral number of wavelengths at the oscillating frequency $f$. By this means, when switch 38 is closed, the locking signal acting upon any oscillator 80 (or 80a) causes the oscillations in that oscillator to resume, or lock in phase, at the phase of previous oscillations in the corresponding oscillator 80 (or 80a) of the next preceding state.

Consider now the operation of the circuit as a serial input shift register. Assume for purposes of illustration that the register is initially cleared; that is to say, each of the signals appearing at the output arms 85 represents a binary "zero," which will be designated phase B hereafter. The binary "one" will be designated phase A. To write the binary number 1011 into the register, signals in phase script notation appear in timed sequence at the input terminal 90 in the following order: (1) phase A, (2) phase A, (3) phase B, (4) phase A. Each of these input signals may have a duration of many cycles at frequency $f$. A series of control pulses 39 open the switch 38 selectively to decouple the pump 36 and the oscillators 80, 80a. The first control pulse is terminated during the duration of the first phase A input to the input terminal 90. This input then determines the phases of resumed oscillations in the oscillators 80, 80a of the first stage 1, and a binary "one" signal then appears at the output arm 85 of the first stage. The other stages 2 to 4 lock in phase with the delayed input signals applied at the input arms 84, which delayed input signals represent the outputs of the preceding stages 1 to 3, respectively, occurring just prior to the first control pulse 39. Because the register was initially cleared, the register stores the binary number 1000 after the termination of the first control pulse 39.

The second control pulse 39 terminates during the duration of the second phase A input signal. This signal then determines the phases of resumed oscillations in the oscillators 80, 80a of the first stage. Simultaneously, the delayed outputs from the hybrid circuits 83 of stages 1, 2, 3 determine the phases of resumed oscillations in the oscillators 80, 80a of stages 2, 3, 4, respectively. This process continues until the binary number 1011 is stored in the register.

The stored number may be read out of the register in serial fashion at the output terminal 92 by applying a series of control pulses 29 to the switch 38. Another binary number may be read into the register simultaneously by applying to the input terminal 90 coded signals in phase script notation. Alternatively, a series of binary "zero" signals of phase B may be applied at the input terminal 90 to clear the register during the serial read out.

Information may also be read out of the register in parallel form by connecting to the directional couplers 88.

Each stage has a directional coupler 88 located near the output of the oscillator 80a. These couplers 88 may be of the type illustrated in FIGURE 2 and described previously. Alternatively, the directional couplers may be located near the output arms 85 of the hybrid circuits 83.

There have been illustrated and described above novel and improved shift register and logic circuits using parametric phase-locked oscillators for handling coded information in phase script notation. These circuits have a high speed of response and are stable in operation. Complete isolation is provided between the input and output terminals, and no power output is lost from the oscillators to the input terminal. Power losses have been reduced without a corresponding sacrifice in operating speed.

Although the various circuits have been described for illustrative purposes as comprising components constructed of strip transmission line, this is not meant to constitute a limitation of the present invention. Similar circuits may be constructed, for example, of two-wire transmission line, wave guide, and coaxial cable.

What is claimed is:

1. The combination comprising: a pair of parametric oscillators; means for applying energizing signals to said oscillators to sustain therein parametric oscillations at one frequency; a hybrid circuit having an input arm, an output arm, two other arms; and means connecting each of said oscillators to a different one of said other two arms, so that the outputs of said oscillators cancel at said input arm and add in phase at said output arm, and means for applying at said input arm input signals at said one frequency for determining the phases of said parametric oscillations.

2. The combination comprising: a pair of parametric oscillators each having two distinct phases of parametric oscillations at the same frequency, means for applying alternating current signals to said oscillators to sustain parametric oscillations therein at said one frequency with the oscillations in one oscillator lagging the oscillations in the other oscillator by 90°, a hybrid circuit having four arms, a signal input circuit connected to one of said arms and an output circuit connected to a second of said arms, means connecting each of said oscillators to a different one of the other arms so that the oscillations from one of said oscillators reaches said hybrid circuit 180° out of phase with the oscillations reaching said hybrid circuit from the other of said oscillators said arms being spaced so that the outputs of said oscillators cancel at said input arm and add in phase at said output arm, and means for applying at said one of said arms input signals at the oscillating frequency for determining the phases of oscillations in said oscillators.

3. The combination comprising: a first parametric oscillator and a second parametric oscillator; means for applying to each said oscillator A.C. energizing signals of such phase that the oscillations in said first oscillator lag the oscillations in said second oscillator by 90°; a hybrid circuit having an input arm, an output arm, and two other arms, each of said other arms being spaced an equal distance from said input arm, means applying the outputs of each of the oscillators to a different one of said other arms so that said outputs arrive 180° out of phase at said input arm, and means for applying at said input arm input signals at the oscillating frequency for determining the phases of the oscillations of said oscillators.

4. The combination comprising: a first parametric oscillator and a second parametric oscillator, each having two distinct states of parametric oscillations at the same one frequency; a hybrid circuit having an output arm electrically isolated from said output arm at said one frequency, an input arm, and two other arms each spaced electrically an equal distance from said input arm; first and second connecting means respectively delivering the outputs of said first oscillator and said second oscillator to arrive at different ones of said two other arms 180° out of phase with each other; and means for applying at said input arm input locking signals at said one frequency for determining the phases of said parametric oscillations.

5. The combination comprising: a first parametric oscillator and a second parametric oscillator each having two distinct phases of parametric oscillations at a frequency $f$ when energized at a frequency $2f$; a common $2f$ energizing source connected to energize said first oscillator 180° out of phase with said second oscillator at said $2f$ frequency; a hybrid circuit having an input arm, an output arm, and two other arms making junctions respectively with said hybrid circuit; means delivering the outputs of said first oscillator and said second oscillator to arrive at different ones of said two other arms 180° out of phase, the distances between said junctions being such that said outputs arriving at said two other arms cancel at said input arm junction and add in phase at said output arm junction; and means for applying at said input arm input signals for locking the phase of said parametric oscillations.

6. A logic circuit comprising the combination set forth in claim 5 wherein said input signals include a reference signal and two information signals, said reference and information signals each having a frequency $f$ and being coded in phase script notation.

7. The logic circuit set forth in claim 6 including control means for intermittently effecting damping of said parametric oscillations.

8. A logic circuit comprising, in combination: a first and a second parametric oscillator each having two distinct states of parametric oscillations at a frequency $f$ when energized at a frequency $2f$; means for energizing said first oscillator 180° out of phase from said second oscillator at said $2f$ frequency; a hybrid circuit having a ring with a mean circumference of $3n\lambda/2$, where $n$ is an odd integer and $\lambda$ is a wavelength at said oscillating frequency $f$, and having an output arm, an input arm, and two other arms making junctions respectively with said ring, said input arm junction being spaced a distance $n\lambda/4$ from each of said two other arm junctions, said output arm junction being spaced a distance of $n\lambda/4$ from one of said two other arm junctions and a distance of $3n\lambda/4$ from the other of said two other arm junctions; separate means delivering the outputs of said first and said second oscillator to arrive at different ones of said two other arms 180° out of phase, one of said separate means providing a delay of $\lambda/4$ greater than the other of said separate means; means for intermittently effecting damping of said parametric oscillations; and means applying at said input arm input signals for locking the phases of said parametric oscillations.

9. The logic circuit set forth in claim 8 including means for applying at said input arm a plurality of separate signals coded in phase script notation and having the same frequency $f$ as said parametric oscillation.

10. A shift register comprising, in combination: a plurality of stages connected in cascade, each of said stages including a first parametric oscillator and a second parametric oscillator each having two distinct states of oscillation at the same frequency, each of said stages further including a hybrid circuit having an input arm, an output arm and two other arms making junctions respectively with said hybrid circuit; means for energizing each said first oscillator to oscillate parametrically 90° out of phase with the parametric oscillations in said second oscillator of the same stage; means delivering the outputs of each said first and said second oscillator to arrive 180° out of phase at different ones of said other two arms of the corresponding said hybrid circuit; a plurality of delay devices each connecting a different said output arm of one said hybrid circuit to said input arm of the next succeeding said hybrid circuit; and means for intermittently effecting damping of said parametric oscillations.

11. The shift register set forth in claim 10 wherein said junctions of each said hybrid circuit are spaced so that said oscillator outputs arriving at said two other arms cancel at said input arm and add in phase at said output arm of the corresponding said hybrid circuit.

12. The shift register set forth in claim 10 including a common energizing source for said first oscillator and said second oscillator of all of said stages.

13. The shift register set forth in claim 10 including means for reading out in parallel the storage state of each of said stages.

References Cited in the file of this patent

UNITED STATES PATENTS

| | | |
|---|---|---|
| 2,789,271 | Budenbom | Apr. 16, 1957 |
| 2,815,488 | Von Neumann | Dec. 3, 1957 |
| 2,914,249 | Goodall | Nov. 24, 1959 |
| 2,977,484 | Sterzer et al. | Mar. 28, 1961 |

FOREIGN PATENTS

| | | |
|---|---|---|
| 778,883 | Great Britain | July 10, 1957 |